Figure 1:
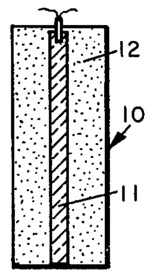

Oct. 31, 1961 R. W. LAWRENCE 3,006,279

OFFSHORE SEISMIC EXPLORATION

Filed June 6, 1957 4 Sheets-Sheet 1

ROBERT W. LAWRENCE
*INVENTOR.*

BY Ernest G. Peterson

AGENT.

OFFSHORE SEISMIC EXPLORATION

Filed June 6, 1957 4 Sheets-Sheet 2

ROBERT W. LAWRENCE
*INVENTOR.*

BY Ernest G. Peterson
AGENT.

OFFSHORE SEISMIC EXPLORATION

Filed June 6, 1957 4 Sheets-Sheet 3

ROBERT W. LAWRENCE
*INVENTOR.*

BY Ernest G. Peterson
AGENT.

ROBERT W. LAWRENCE
*INVENTOR.*

BY Ernest G. Peterson
AGENT

United States Patent Office 3,006,279

Patented Oct. 31, 1961

3,006,279

OFFSHORE SEISMIC EXPLORATION

Robert W. Lawrence, Wilmington, Del., assignor to Hercules Powder Company, Wilmington, Del., a corporation of Delaware Filed June 6, 1957, Ser. No. 664,059

9 Claims. (Cl. 102—22)

This invention relates to a method for conducting seismic operations in water-covered areas. In one aspect this invention relates to offshore seismic prospecting methods employing charges which provide for improved seismic records while at the same time insuring against high fish kill. In another aspect this invention relates to the use of a selected, detonatable explosive surrounded by a non-detonating sheath, capable of self-sustained burning, in offshore seismic prospecting, whereby high fish kill, barred by fish and game authorities in certain areas, is prevented, and improved seismic records are obtained.

Seismic exploration or prospecting involves the introduction of energy into the earth from controlled explosions to initiate wave action for measurement of characteristics of subsurface structures. Thus, seismic prospecting, or surveying, is based upon the generation of sound or seismic waves in the earth's crust and detecting, recording and interpreting the waves which are reflected or refracted back to the earth's surface from buried strata interfaces and the like. The waves indicated in the earth are more properly designated as elastic waves, since they depend on the resistance of formations of the materials through which they propagate. A wave traveling downwardly in the earth strikes stratigraphic discontinuities, being reflected back toward the surface. The depth of the reflecting interface is determined by the time required for the reflected wave to make its trip down and back to the detecting instruments. With refraction, intersurface structure is mapped by measuring the travel time required for waves penetrating the earth to be deflected back to the surface at greater horizontal distances along paths determined by variations in elastic wave velocity with depth.

In land seismic operations the explosive to be fired to provide the necessary energy is placed in a borehole generally of depth of about 50–500 feet or higher. High velocity high explosives are preferred in order to provide the most satisfactory seismic record. The gelatin dynamites are preferred in these operations by which term it is meant to include straight gelatins, ammonia gelatins, and permissible gelatins.

In recent years offshore seismic prospecting, by which term is meant seismic exploration of water-covered areas, particularly coastal areas, has become quite extensive. In such operations the explosive charge is generally floated or otherwise supported a few feet below the water surface area and fired, the resulting energy waves traveling into the earth below the water body and being reflected or refracted to the detecting instrument to indicate the subsurface structure. As in case of land operations, high velocity high explosives applied to offshore prospecting provide for excellent seismic records. However, the use of such high explosives, e.g., a 60 percent gelatin dynamite, produces a sharp shock wave with an abrupt front of great pressure intensity, which is desirable from a seismographic point of view but unfortunately is unduly damaging to certain marine life, particularly fish which possess a swim, or air bladder, most of the important food and game species possessing that structure. Thus heavy mortalities of valued fishes have resulted from offshore seismic operations heretofore. In view of the high fish kill that has been encountered at times in offshore seismic operations, permits have been refused for such operations in those areas where explosives that cause high fish kill might be employed and accordingly, high velocity high explosives no longer find use in such areas.

A number of charges have been investigated as suitable substitutes for the high explosives heretofore employed. Thus utilization of high explosives, characterized by a significantly low detonation rate, although it results in a reduction of peak detonating pressure with concomitantly lowered shock, nevertheless results in very little improvement so far as achieving lowered fish kill is concerned. Similarly, use of high explosive charges of reduced size does not contribute to any significant reduction in fish kill but does reduce the seismic efficiency.

Although some fish kill is encountered employing black powder as a substitute for high explosive seismic charges, in offshore prospecting, the degree of kill is so much less than that encountered when employing such charges that some authorities have approved black powder as a suitable substitute. Black powder has been accordingly employed in certain coastal areas for some time.

Black powder, being nodetonatable, exhibits, as might be expected, a degree of shock when fired, which is markedly less than that characteristic of detonatable explosives. However, a plot of detonating pressure versus time, from firing black powder, although it shows a pressure peak considerably lower than that obtained from firing a detonatable explosive still shows an impulse sufficient for a seismic record. This record varies from good to poor and thus leaves much to be desired. However, black powder, heretofore, has been the only substitute considered suitable from the standpoint of fish kill and has therefore remained in use.

This invention is concerned with a method for offshore prospecting in which fish kill is reduced to a level acceptable by authorities in certain coastal areas and wherein a seismic record is obtained which is markedly improved over that obtained when employing black powder as the energy source.

An object of this invention is to provide a method for offshore prospecting. Another object is to provide for markedly lower fish kill than has been encountered heretofore offshore prospecting employing detonatable explosives as the energy source. Another object is to provide seismic records in offshore prospecting which are much improved over those obtained heretofore when utilizing black powder as the energy source, without the occurrence of unduly high fish kill. Another object is to provide for use of a detonatable explosive in seismic offshore prospecting without the occurrence of high fish kill encountered heretofore. Still another object is to provide new explosive compositions especially suitable for offshore prospecting. Other aspects and objects will be apparent in light of the accompanying disclosure and the appended claims.

In accordance with this invention an offshore seismic exploration method is provided wherein energy for seismic waves is supplied by detonating a low velocity detonatable explosive while maintaining a sheath of a non-detonating material capable of self-sustained decomposition around said explosive in an amount sufficient to substantially reduce the peak detonating pressure of said explosive, whereby a seismic record improved over that from firing black powder as the energy source is obtained without encountering unduly high fish kill.

Detonatable explosive or "core" compositions, employed in accordance with this invention are illustrated with reference to the following formulations:

| | A | B | C | D |
|---|---|---|---|---|
| | *Percent* | *Percent* | *Percent* | *Percent* |
| Nitroglycerin | 5.4 | 9.4 | 9.4 | 10.8 |
| Nitrocellulose | 0.1 | 0.1 | 0.1 | 0.2 |
| Ammonium Nitrate[1] | 89.3 | 67.5 | 67.5 | 13.5 |
| Sodium Nitrate | | 13.5 | 13.5 | 56.5 |
| Starch | | | | 6.0 |
| Coal | 4.7 | | | |
| Oat Hulls | | 5.0 | 5.0 | |
| Nut Meal | | 4.0 | 4.0 | 8.5 |
| Sulfur | | | | 4.0 |
| Chalk | 0.5 | 0.5 | 0.5 | 0.5 |
| | 100.0 | 100.0 | 100.0 | 100.0 |
| Det. Velocity, m./sec | 1,500±200 | 1,500±200 | 1,100±100 | 2,200±200 |

[1] Mesh Size:
A—About 12 to 60 mesh.
B—About 12 to 60 mesh.
C—About 10 to 30 mesh.
D—About 20 to 200 mesh.

Nondetonating sheath compositions, i.e., there being no propagation through the entire charge, capable of self-sustained decompositon, employed in accordance with this invention, are illustrated by the following formulations:

| | A[2] | B | C[2] | D | E |
|---|---|---|---|---|---|
| | *Percent* | *Percent* | *Percent* | *Percent* | *Percent* |
| Sodium Nitrate | | | | 75 | 75 |
| Ammonium Nitrate[1] | 89.5 | 82.5 | 97.0 | | |
| 80/20Rosin/Paraffin Ctg | 5.0 | 4.5 | | | |
| Fuller's earth or kieselguhr | 5.0 | 4.5 | 1.0 | | |
| Zinc Oxide | 0.5 | 0.5 | | | |
| Chalk | | 8.0 | | | |
| Coal | | | 2.0 | 12 | |
| Sulfur | | | | 12 | |
| Pulp | | | | | 25 |
| DNT (Oily) | | | | 1 | |
| | 100.0 | 100.0 | 100.0 | 100 | 100 |

[1] About 12 to 200 mesh.
[2] Can be detonated if suitably primed. As used in the practice of the invention only a partial detonation, in any event, can occur.

The detonatable core component of the charge, employed in accordance with this invention, is characterized by a low-detonating rate and is therefore referred herein as a low-velocity high explosive. By the term low-velocity, or low-detonating rate, it is meant such a rate lower than those characteristic of dynamites conventionally utilized for seismic operations on the ground, which, in most instances, are in the order of from 3000 to 7000 meters per second.

The low-velocity high explosive cores employed in accordance with this invention therefore exhibit a detonating rate generally under 3000 meters per second (mps.), although they can be above such values, dependent upon the particular fish kill problem involved, but, in any event, being markedly lower than those of conventional high velocity seismic dynamites. Detonation velocities employed will, however, generally be in the range of from about 1000 to 2400 mps. It is preferred, in most instances, particularly wherein fish population may be expected to be high, that the detonating rate of the core composition be as low as possible while remaining consistently detonatable, e.g., in the order of about 1500 to 2000 mps. However, when the fish kill problem at hand permits, a higher detonating rate is desired inasmuch as somewhat sharper seismic records are obtained thereby. In any event, seismic records, obtained in accordance with this invention, are markedly improved over those obtained when firing black powder as the seismic energy source, without unduly high fish kill.

Satisfactory core compositions may contain on a weight basis from about 10 to 95 percent ammonium nitrate; from about 3 to 11 percent nitroglycerin; and from about 0.05 to 0.3 percent nitrocellulose, and suitable additional ingredients such as carbonaceous materials, desensitizing agents, antacids, and the like. Alkali metal nitrate in an amount in the range of about 10 to 60 weight percent can be employed in the core composition, when desired. From 4 to 20 percent carbonaceous material and 0.5 to 1 percent antacid are generally employed.

The now preferred core composition contains ammonium nitrate in the range of from 50 to 95 percent and nitroglycerin in a range of from about 5 to 9 percent, and nitrocellulose, when desired, in small amounts, say about 0.1 to 0.2 percent.

It is to be noted that the foregoing core compositions are set forth by way of illustration only, the core composition essentially being one that detonates at a low rate as set forth herein to cause decomposition of the sheath. Thus, for example neither nitrocellulose nor ammonium nitrate are specifically required although they are advantageously employed as core components. Various suitable core compositions not specifically illustrated herein are apparent in light of the accompanying disclosure.

Sheath compositions employed comprise any suitable material that will undergo self-sustained decomposition and which are nondetonating under the firing conditions, i.e., there is no propagation through the entire charge, the detonation being only partial if any detonation occurs at all. That is to say, the sheath must be "active." An inactive sheath material is not suitable inasmuch as it does not supply energy upon firing of the charge, with the result that an insufficient impulse is provided for accomplishing a suitable seismic record. Further exemplary of suitable materials employed as the main sheath composition in the practice of this invention are guanidine nitrate, ammonium persulfate and the like, as exothermically decomposing ingredients.

Sheath compositions containing ammonium nitrate and/or sodium nitrate as the major ingredient are now preferred and contain from about 80 to 98 weight percent ammonium nitrate, or from 60 to 80 weight percent alkali metal nitrate, preferably sodium nitrate, or if desired, a mixture of those oxidizing salts in commensurate proportions. Also present in the sheath compositions are additional materials as preferred, including suitable carbonaceous components as paraffin, coal, rosin, rosin paraffin, and the like, suitable inorganic constituents as sulfur and chalk, and, when desired, nitrate aromatic compounds as dinitrotoluene, mononitrotoluene, and the like. Black powder is also a suitable sheath material alone or with other components, as desired.

The core compositions can be characterized by any suitable density so long as a suitable propagation rate is achieved. Heretofore, core compositions having a density of from 0.8 to 1.3 grams per cc. have been utilized. In any event, a density as high as possible without adversely affecting sensitivity is advantageously employed because it permits shooting a maximum amount of explosive, which in turn contributes to the quality of the seismic record. Further, the higher density explosive is easier to submerge to its position below the water surface than is an explosive of relatively low density.

An exemplary sheath charge is characterized by a ratio of minimum wall thickness of the sheath to maximum linear cross sectional dimension of the core within the range of from about 0.5:1 to 1.5:1. The charge is preferably cylindrical with the core axially disposed therein and the sheath material fills the annulus about the core. The sheath can cover the end of the core in a thickness approximating that of the sheath annulus. Further exemplary of the charge is a core having a diameter within the range of 1¼ to 3 inches and a length of from 6 to 32 inches. However, it is to be understood that the dimensions outside the above ranges can be employed, it being important in any event that the sheath be an active sheath and the core composition be characterized by a low detonation rate.

A now-preferred charge is made up by positioning a plurality of cylindrical core cartridges, say about 4 to 5 cartridges, axially in a paper tube of greater diameter and disposing the sheath material in the annulus to fill the tube to completion. Advantageously employed as containers for the assembly are spiral wound paper shells of ICC specification 23 G or thin gauge metal cans, preferably 3½ to 8½ inch diameter, the walls of the metal cans being in the order of about 26 to 32 gauge. The core units can be aligned 4 to 5 high, as above described, or a plurality of such resulting units can be detonated side by side. The now preferred charge contains from 3 to 5 core cartridges, e.g., 2 by 4 to 2 by 8 inches and has a gross weight in the order of from 35 to 50 pounds. Obviously, it is within the scope of the invention to employ any suitable arrangement of core units and sheath material.

Figure 4:
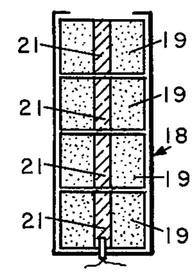
Figure 5:
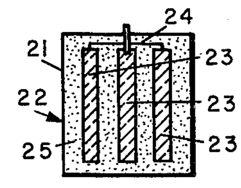
Figure 5A:
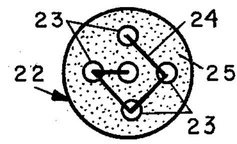
Figure 6:
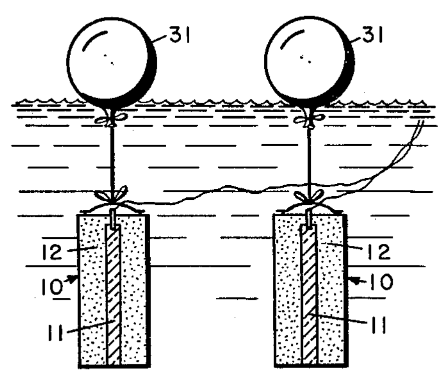
Figure 7:
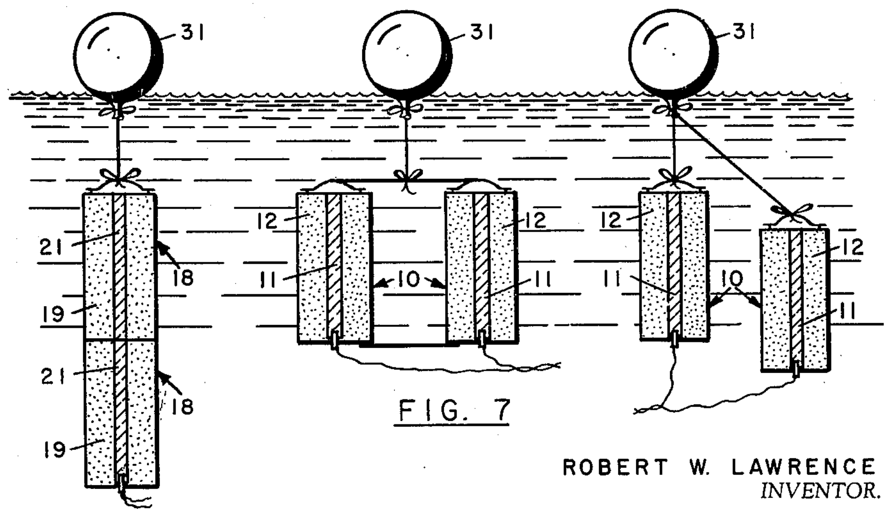
Figure 8:
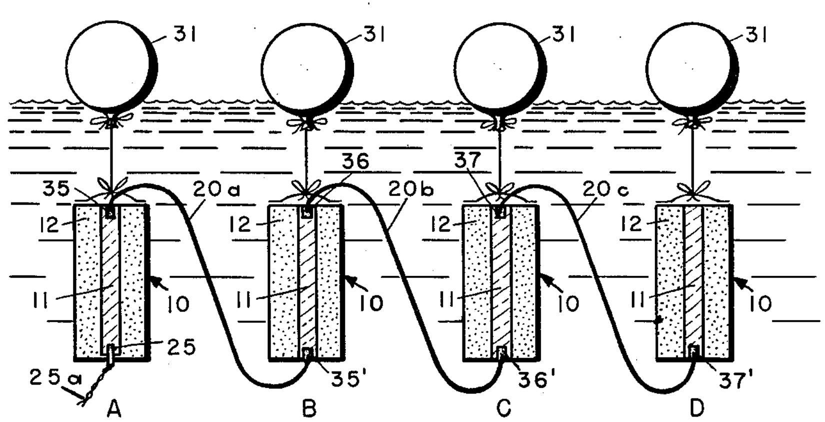
Figure 9:
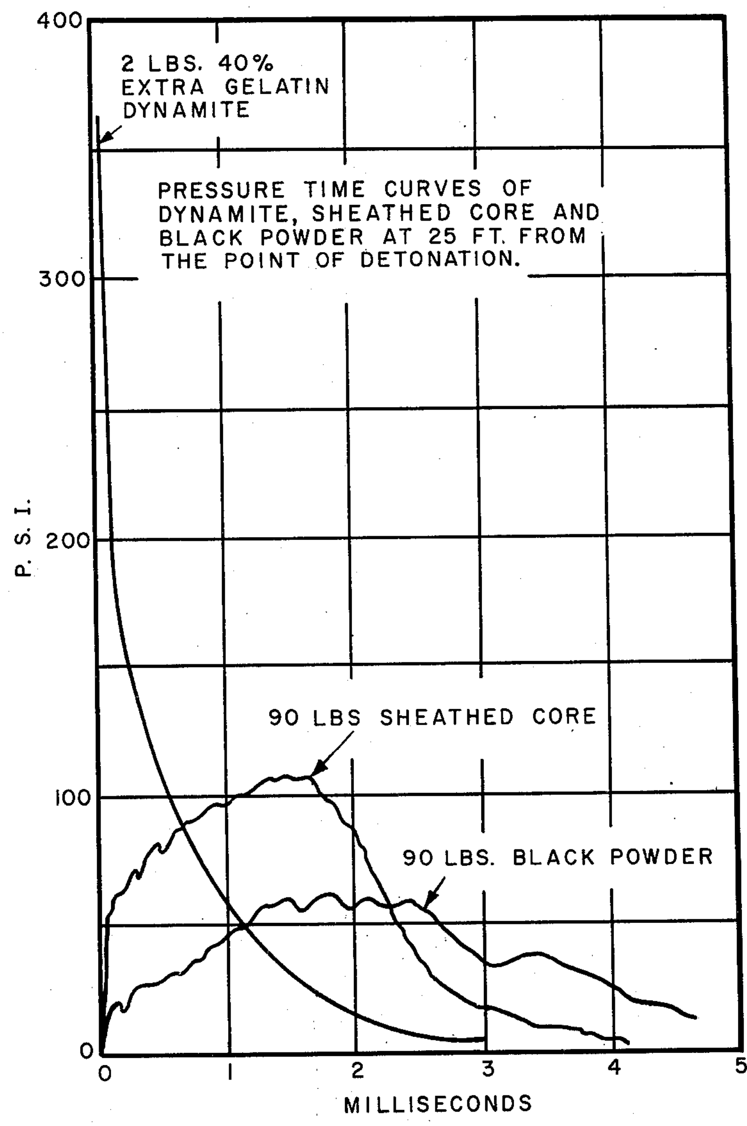
Figure 10:
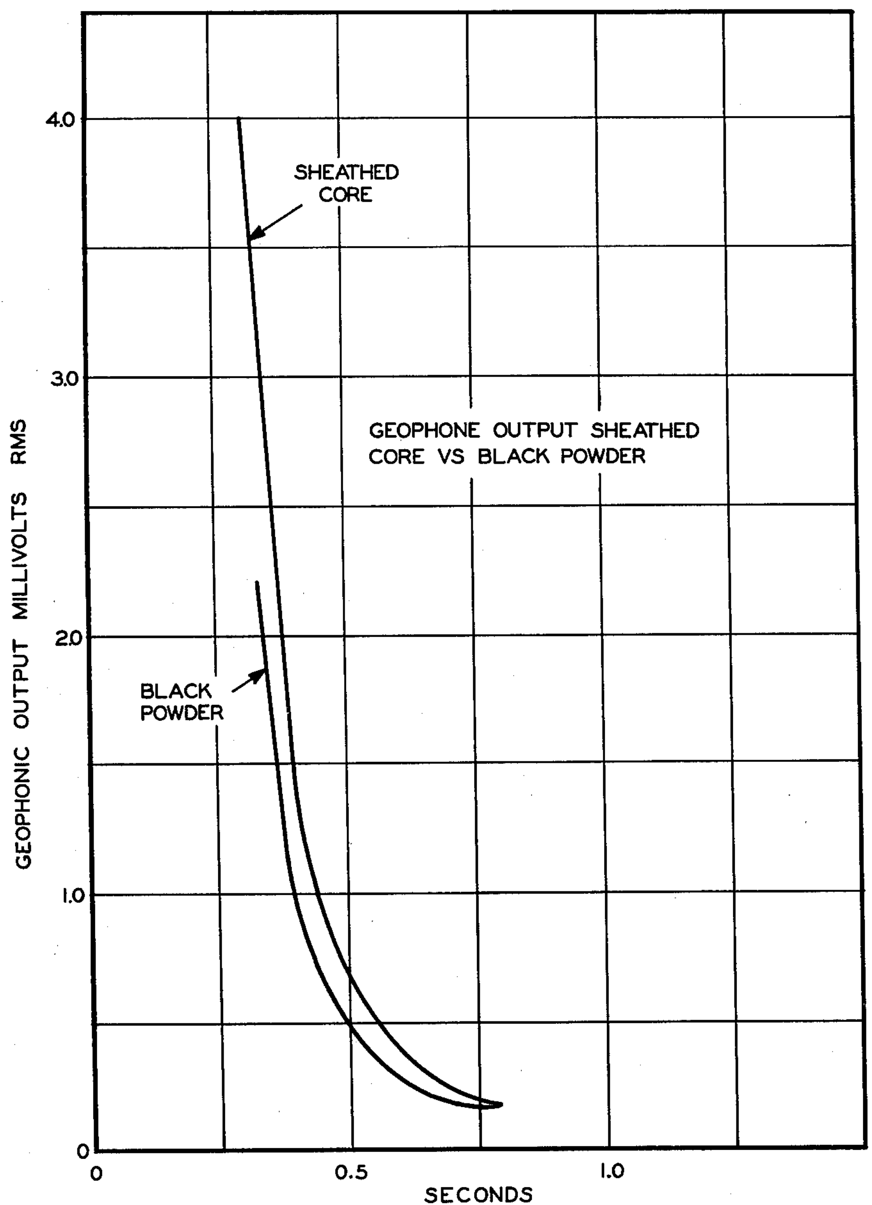

The invention is further illustrated with reference to the attached drawings of which FIGURES 1–5 and 5A further illustrate sheath-core charges of this invention, FIGURES 6, 7 and 8 illustrate suspension of the charges under water, and FIGURES 9 and 10 illustrate low fish kill and seismic records obtained when firing the charges of this invention as compared with such characteristics of black powder and bare dynamites.

Figure 2:
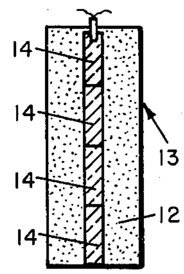
Figure 3:
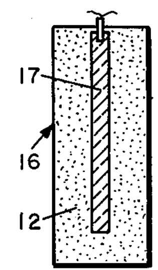

With reference to FIGURE 1, cartridge 10 of any suitable diameter as, for example, 6½ inches, contains a single detonatable core composition 11 as, for example, about 32 inches in length and weighing from 3 to 4 pounds. Active sheath 12 fills the annulus space around core 11. The charge 10 is elongated and charge 11 is disposed longitudinally therein preferably coaxially. FIGURE 2 illustrates cartridge 13 having about the same overall dimensions as those of cartridge 10 of FIGURE 1 but containing a plurality of cores 14, each in the order of about 7 inches in length. Sheath material 12 fills the annular space around the column of cores 14 which is preferably axially disposed in the elongated charge. Cores 14, although generally supported in end to end relation to form a single column, can be when desired spaced apart with reference to each other so as to reduce the effective overall detonation rate of the dynamite column. The spacing can be extended to a maximum value which will not preclude propagation of the explosive waves throughout the entire core. FIGURE 3 illustrates a charge 16 similar to charge 12 of FIGURES 1 and 2 except that the sheath material 12 completely surrounds the longitudinally disposed core 17. FIGURE 4 illustrates a plurality of sheath-core units, each comprising a core 21 and sheath 19 disposed inside elongated container 18. When desired, each of these units or any plurality can be spaced apart sufficiently so as to reduce the effective overall detonation velocity of the entire column of core. FIGURE 5 illustrates a cartridge 22 larger than those of FIGURES 1–4 and containing a plurality of longitudinally positioned and spaced apart cores 23. Shell 21 is generally metal although as in the foregoing illustrations, other suitable shell compositions can be utilized. Cartridge 22 provides for detonation of a larger amount of explosive than is detonated in a charge of the type illustrated in FIGURES 1–4, without need for exceeding the maximum water depth at which collapse of the bubble would otherwise occur. This cartridge, by a virtue of the large amount of explosive detonated, contributes to a further improved seismic record. Cores 23 are distributed in container 22 in spaced apart relationship being surrounded by sheath composition 25 which together with the cores 23 completely fills container 22. Any suitable means can be used for detonating the plurality of cores 23, a detonatable fuse cord 24 being advantageously utilized for that purpose (FIGURE 5A).

FIGURES 6 and 7 illustrate suspension of a cartridge or plurality of cartridges below the water surface by means of balloons 31. The charges are suspended at a point in close proximity to the water surface, for example from 1–6 feet. This is important inasmuch as if the charge is detonated at a greater water depth, "bubble pulsation" is very likely to occur. From about 3 to 5 feet from the water surface to the top of the sheathed charge is generally preferred. Thus, at an excessive depth the bubble pulse produces a secondary impulse at the instant of maximum compression of the bubble (bubble collapse) which records on the seismograph and impairs the seismic record by providing an out of phase or random duplication. The bubble pulse, when it occurs, does so in a small fraction of a second often from 0.25 to 0.30 second after the original detonation.

As further illustrated with reference to FIGURES 6 and 7, firing in an upward direction has been found to provide the most useful impulse for seismic purposes with the least chance for fish kill. Thus, bubble pulsation at a given water depth is least likely to occur when the charge has been fired in an upward direction.

The core-sheath compositions employed in accordance with this invention are further illustrated with reference to the attached FIG. 9 which contains plots of detonation pressure versus time of (1) a bare dynamite charge having a detonation rate of about 4000 mps., (2) black powder, and (3) a sheathed core composition employed in the practice of this invention.

As now understood, the lethal shock to the fishes from bare dynamite is the result of the high pressure peak and short time required for rise to the said peak, i.e., rise time illustrated. Firing of black powder, as illustrated, provides the lowest peak pressure of those indicated, and the seismic record is acceptable consonant with the impulse illustrated. The sheath core compositions, as illustrated, exhibit a low-pressure peak, although somewhat higher than that characteristic of black powder, and a pressure rise rate somewhat higher than that of black powder but provide an improved impulse to give a seismic record markedly improved over that obtained by the black powder.

FIG. 10 illustrates seismic records in terms of Geophone output signal obtained by firing black powder and sheath core compositions in accordance with this invention, the weight of black powder and sheath charge being the same, and both, of course, having been fired in the same area. The record, a plot of voltage from the Geophone versus time show the markedly greater amplitude of vibration obtained when firing the sheath core charge.

The following examples are illustrative of the low fish kill obtained when firing sheath core charges in the practice of this invention and demonstrate that the kill is not in substantial excess of that obtained when firing black powder, as manifest by the average damage range, also referred to in the art as "lethal distance." The average damage range is that distance from, or radius of, the charge within which the explosion is of such intensity as to cause sufficient shock to damage the fishes. Any such shock is considered "lethal" inasmuch as it will cause immediate fish kill or will cause damage as to preclude survival for any reasonable time. The greater the damage range therefore, the more lethal is the powder and the greater is the fish kill. Each of the examples sets forth data obtained from tests run as follows.

TABLE I

| | Black Powder | Sheath Core [1] | Black Powder | Sheath Core [1] | Black Powder | Sheath Core [1] | Black Powder | Sheath Core [1] | Black Powder | Sheath Core [1] |
|---|---|---|---|---|---|---|---|---|---|---|
| Powder,[3] Average Weight, Lbs | 90 | 84 | 90 | 86 | 90 | 88 | 90 | 88 | 90 | 88 |
| Orientation of Cages | Horizontal | | Horizontal | | Horizontal | | Horizontal | | Vertical | |
| Depth of Cages, Feet | 2.5 | 2.5 | 25 | 25 | 42 | 42 | 55 | 55 | [2] 43 | [2] 43 |
| Average Number of Fish Used | 91 | 93 | 90 | 89 | 84 | 81 | 60 | 59 | 90 | 86 |
| Average Damage Range, Feet | 27 | 35 | 37 | 45 | 38 | 39 | 50 | 38 | 37 | 53 |

[1] Composition, Weight Percent:

| Core: | *Percent* |
|---|---|
| Nitroglycerin | 5.4 |
| Nitrocellulose | 0.1 |
| Ammonium Nitrate | 89.3 |
| Sodium Nitrate | |
| Starch | |
| Coal | 4.7 |
| Oat Hulls | |
| Nut Meal | |
| Sulfur | |
| Chalk | 0.5 |
| | 100.0 |

| Sheath: | *Percent* |
|---|---|
| Sodium Nitrate | |
| Ammonium Nitrate | 82.5 |
| 80/20Rosin/Paraffin Ctg | 4.5 |
| Fuller's Earth or kieselguhr | 4.5 |
| Zinc Oxide | 0.5 |
| Chalk | 8.0 |
| Coal | |
| Sulfur | |
| Pulp | |
| DNT (Oily) | |
| | 100.0 |

[2] Average depth.

[3] Distance from water surface to top of black powder charge was 5 feet. Distance from water surface to top of sheath core charge was 1½ feet Three cage units, each unit containing 15 cages, 7 by 7 by 7 inches, were assembled in a series, each unit having a 10-foot length. A 24-inch gap interrupted the continuity between cage units, the entire assembly length being 34 feet. The assembly was placed in the water and floated by metal buoys, both in horizontal and vertical positions at various distances from the charge. The distances between the charge and the cages were selected so as to encompass the entire range of distance within which damage to fish occurred.

Two anchoves were added to each cage with the cage immersed in sea water. The filled cages were then joined and positioned with reference to charge for the firing test. Following each shot, the fish were removed from the cage, disected, and examined for macroscopic damage.

In both series of tests, as illustrated with reference to Table I, the anchovy species was selected for study because the anchovy is highly susceptible to damage from underwater blasts and is frequently observed to be skilled in the unconfined condition and also because it occurs near the surface in concentrated schools. Since the uppermost 30 feet of water appears to be the most critical area for fish damage from underwater explosions set off near the surface, such pelgaic species as the anchovy are the most potential victims. Because of their concentrated numbers, the kill of such fish can be at times very great. The anchovy, being ideal for analysis of damage by macroscopic dissection, further facilitates interpretation of the test data. The anchovy provides an excellent index of shock wave damage, and the results obtained from a study of this species can be extrapolated to other forms possessing swim bladders.

In Table II are results of tests inclusive of a variety of invertebrate animals.

TABLE II

*Tests with sheathed powder and black powder using caged invertebrate animals* [1]

| Test | 1 | 2 | 3 | 4 | 5 | 6 | 7 | 8 |
|---|---|---|---|---|---|---|---|---|
| Water depth (ft.) | 54 | 54 | 54 | 42 | 42 | 54 | 42 | 42. |
| Depth cages 1 and 45 (ft.) | 2.5, 2.5 | 2.5, 2.5 | 2.5, 2.5 | 42, 42 | 42, 42 | 2.5, 2.5 | 42, 42 | 42, 42. |
| Distance: | | | | | | | | |
| Charge to cages (ft.) | 26–27.5 | 26, 28.5 | 25.5–34.5 | 38.5 | 38.5, 39.5 | 25.5, 34.5 | 38.5 | 38.5, 39.5. |
| Weight of charge. lbs | 88.4 | 88.4 | 88.4 | 88.4 | 88.4 | 90 | 90 | 90. |
| Type of charge | Sheathed Core. [2] | Sheathed Core [2] | Sheathed Core [2] | Sheathed Core. [2] | Sheathed Core. [2] | Black Powder. | Black Powder. | Black Powder. |
| Cage orientation | Horizontal | Horizontal | Horizontal | Horizontal | Horizontal | Horizontal | Horizontal | Horzontal. |
| Type of animal | Sea Cucumber. | Starfish | Crabs | Lobster | Abalone | Crabs | Lobster | Abalone. |
| Number of animals | 2 | 2 | 17 | 3 | 7 | 17 | 3 | 7. |
| Number damaged | 0 | 0 | 0 | 0 | 0 | 0 | 0 | 0. |

[1] Distance from water surface to top of black powder charge was 5 feet in all cases. Distance from water surface to top of sheath core charge was 1¼ feet in all cases.

[2] Same composition as tabulated in footnote of Table I.

The low damage range as shown in Table I for black powder has been for some time considered by authorities as sufficiently low, and they have therefore permitted its use as a source of energy for submarine seismographic surveys. Also shown in Table I are comparable data demonstrating average damage ranges for seismic charges of this invention, which ranges, although slightly greater than those of black powder, are considered sufficiently low as to be acceptable for offshore prospecting.

As borne out by the foregoing data, it has been found that when employing comparable charges the maximum lethal distance for black powder is about 45 to 50 feet, and for the sheathed core composition, it is in the order of about 60 feet. With similar charges of dynamite, high velocity dynamite (1 to 5 pounds), lethal distances of 100 feet and more are obtained. Further it has been found that, weight for weight, the core sheath compositions employed in accordance with this invention provide 50 percent greater seismic energy return than obtained with black powder.

The foregoing data further demonstrate that the sheathed core compositions, employed in accordance with this invention, are sufficiently innocuous to marine life as to serve suitably as a substitute for black powder. Further, the data illustrate the seismic record obtained in accordance with this invention, which is markedly improved over that obtained employing black powder as the energy source.

The following tabulation is further illustrative of lethal distance of high-velocity explosives with reference to one-pound spherical TNT-tetryl charges, using caged anchovies, consonant with procedure described hereinabove with reference to Tables I and II. The high lethal distance observed demonstrates the basis on which use of black powder has been permitted in lieu of bare high explosives.

TABLE III

| | 1 | 2 | 3 |
|---|---|---|---|
| Depth, feet: | | | |
| Water | 156 | 30 | 156 |
| Charge | 30 | 30 | 6 |
| Pickup | 30 | 1.5 | 1.5 |
| Distance, feet: | | | |
| Charge to Pickup | 98 | 81 | 94 |
| Charge to Cage | 65 | 75 | 65 |
| Peak Pressure, p.s.i. | 124 | 124 | 218 |
| Maximum Lethal Range, feet | >98 | >108 | >93 |

The sheathed core compositions preferably employed exhibit a peak detonating pressure in the range of from about 75 to 160 p.s.i. at 25 feet from the explosive and a pressure rise rate (also at 25-foot distance) during detonation in the order of about 1000 to 6000 p.s.i./ms. So far as is now understood, it appears that the combination of pressure peak and pressure rise rate is important in determining the function of the sheathed core compositions in the practice of this invention. However, when employing a sheathed core charge of composition and relative dimensions of core and sheath above described, the pressure peak and rise rate characteristics are inherently present.

The following tabulation further illustrates the markedly higher peak pressures that are obtained when firing a bare dynamite charge than when firing a sheath-core composition of this invention. Thus, bare dynamite compositions I, II, IIIA and IIIB of respective weights 4.5, 2, 0.4 and 1 pound show peak pressures at 25 feet in the order of from 168 to 369 p.s.i. which, of course, would be still higher in the event of firing greater weights particularly as illustrated by dynamite composition I.

Dynamite composition III is the detonatable core of both sheath-core composition from I' to II' and provides peak pressures of 168 and 200 when respective weights of 0.4 and 1 pound are shot. However, the same composition, even in a much larger weight, when sheathed in accordance with the invention, provides still lower peak pressures as illustrated, i.e., 142 and 241 p.s.i.g. at 25 feet when the quantity of core in the charge is from 6 to 20 times greater. The tabulation is further illustrative of the fact that the core-sheath compositions provide for firing an amount of dynamite many times the amount of bare dynamite that can be fired while still maintaining low fish kill and at the same time providing a good seismic record quite superior to that obtained when firing black powder.

TABLE IV

| Blasting Agent—Composition (Weight Percent) | | Weight, lbs. | Detonation Rate (Meters per Second) | Distance, feet 25 | 50 | 100 |
|---|---|---|---|---|---|---|
| I. Ammonia Permissible Type Dynamite: | | | | | | |
| Nitroglycerin | 11.9 | 4.5 | 3,000 | 282 | | |
| Nitrocellulose | 0.1 | | | | | |
| Ammonium Nitrate | 74.6 | | | | | |
| Sodium Nitrate | 5.0 | | | | | |
| Carbonaceous Material | 7.9 | | | | | |
| Chalk | 0.5 | | | | | |
| II. Extra Gelatin, 40 Percent: | | | | | | |
| Nitroglycerin | 25.00 | 2 | 2,000 | 369 | | |
| Nitrocellulose | 0.45 | | | | | |
| Ammonium Nitrate | 11.0 | | | | | |
| Sodium Nitrate | 47.5 | | | | | |
| Carbonaceous Material | 11.0 | | | | | |
| Sulfur | 4.0 | | | | | |
| Chalk | 1.0 | | | | | |
| III. Ammonia Permissible Type, Low Velocity: | | | | | | |
| Nitroglycerin | 5.4 | III A. 0.4 | 1,600 | 168 | | |
| Nitrocotton | 0.1 | III B. 1 | 1,600 | 200 | | |
| Ammonium Nitrate | 89.3 | | | | | |
| Coal | 4.7 | | | | | |
| Chalk | 0.5 | | | | | |

| Sheathed Core Composition, Wt. Percent Basis | | | Weight, lbs. | Distance, feet 25 | 50 | 100 |
|---|---|---|---|---|---|---|
| I'. Sheath: | | | | | | |
| DNT (Oily) | 1 | Coal 12 | 80 | 142 | 96 | 35 |
| Sodium Nitrate | 75 | Sulfur 12 | | | | |
| Core (6 lbs., 1800 m.p.s.): | | | | | | |
| NG | 5.4 | Coal 4.7 | | | | |
| NC | 0.1 | Chalk 0.5 | | | | |
| Ammonium Nitrate | 89.3 | | | | | |
| II'. Sheath: | | | | | | |
| Ammonium Nitrate | 89.5 | | 90 | 241 | 138 | 50 |
| 80/20 Rosin/Paraffin coating | 5 | | | | | |
| Fuller's Earth or Kieselguhr | 5 | | | | | |
| Zinc Oxide | 0.5 | | | | | |
| Core (8 lbs., 1800 m.p.s.): | | | | | | |
| NG | 5.4 | Coal 4.7 | | | | |
| NC | 0.1 | Chalk 0.5 | | | | |
| Ammonium Nitrate | 89.3 | | | | | |

FIGURE 8 is illustrative of one embodiment of a multicartridge assembly characterized by a particularly low fish kill potential by virtue of delayed detonation of each cartridge. With reference to FIGURE 8, electric blasting cap 25 is disposed in an end of cartridge 10A, preferably in the bottom end, in operative communication with cap-sensitive core 11 to detonate the core when fired by an electric current passed through the leg wires **25*a* from an electric power source not shown. Low energy detonating fuse cords 20*a*, 20*b* and 20*c* contain in the order of about 1–5 grains of PETN per foot, preferably about 2 grains per foot as compared with about 50 grains per foot in conventional detonating fuse cords, e.g., Primacord. Cord 20*a* is secured at the end of cartridge 10A, opposite that containing cap 25 in operative contact with a primer 35, e.g., from ¼–½ gram of PETN, the said primer 35 being supported in operative communication with core 11 so as to be detonated as result of detonation of core 11. A copper shell as a container for the primer 35 and adapted also to secure cord 20*a* to the primer and to support the primer in operative contact with core 11 is advantageously employed. The remaining end of cord 20*a* is similarly supported in one end of cartridge 10B, preferably the bottom end, in operative contact with a primer 35' to detonate the primer and cause detonation of core 11 in cartridge 10B. Fuse cords 20*b* and 20*c* are similarly adapted to respectively operatively connect cartridges 10B with 10C and 10C with 10D so that detonation of core 11 of cartridge 10A by firing cap 25 initiates primer 35, which in turn initiates cord 20*a*, primer 35', core 11 of cartridge 10B, booster 36, fuse cord 20*b*** and on until the entire assembly has been detonated.

The multicartridge hookup of FIGURE 8 by virtue of the delay following detonation of each core 11 provides for a prolonged period during which the degree of shock from detonation is minimized, a minimum low fish kill potential being thereby achieved. By use of a low energy detonating fuse cord as illustrated, a minimum of energy is released so that the fish kill potential by virtue of detonation of the fuse cord itself is markedly lower than would be obtained employing a convention detonating fuse cord, e.g., Primacord.

The peak pressure will be determined by the individual charges and the total impulse (integrated effect of pressure and time) by the number of charges. Hence, the total impulse which is related to the seismic results may be increased without increasing the fish kill which is controlled by the peak pressure and rate of pressure rise of the individual charges.

By way of further illustration, assuming each core 11 to be 2.8 feet long and having a detonation rate of 7000 feet per second and each detonating fuse cord being 10 feet in length, each core will require about 0.4 millisecond to detonate and each fuse cord will require about 0.5 millisecond to detonate so that there is a duration of about 3.1 milliseconds over which the assembly is detonated. Thus, the degree of shock has been minimized with accompanying low fish kill potential while at the same time an improved seismic record is obtained.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. An explosive device comprising at least one elongated container, at least one longitudinally extending core of a dynamite within each such container, characterized by a detonation rate of at least 1,000 and less than about 3,000 meters per second, and a material filling the remainder of said container, as a sheath around said core, and being capable of self-sustained decomposition in response to detonation of said core and also detonatable in response to said detonation but only to the extent that propagation of wave action from the resulting detonation takes place through a portion of said sheath charge, the said sheath material comprising a carbonaceous material and from 80 to 98 weight percent ammonium nitrate.

2. An explosive device comprising an elongated container, a plurality of elongated dynamite cartridges axially disposed end to end in said container to form a dynamite core therein characterized by a detonation rate of at least 1,000 and less than about 3,000 meters per second, a sheath material in said container disposed as an annulus surrounding the said core and having a wall thickness in a ratio to the diameter of said core in a range of from 0.5:1 to 1.5:1 and said sheath material comprising a carbonaceous material and from 80 to 98 weight percent ammonium nitrate and being capable of self-sustained decomposition in response to detonation of said core and also being detonatable in response to said detonation but only to the extent that propagation of wave action from the resulting detonation takes place through a portion of said sheathing charge.

3. A device of claim 2 wherein said core contains on a weight basis from 10 to 95 percent ammonium nitrate, from 3 to 11 percent nitroglycerin, and from 4 to 20 percent carbonaceous material.

4. In a method for seismic exploration of water-covered areas by generation of energy for seismic waves at a source below the water surface, the improvement comprising generating said energy by detonating a dynamite characterized by a detonation rate of at least about 1,000 and below about 3,000 meters per second while mantaining a partially detonatable material around said dynamite, as a sheath therefor, comprising a carbonaceous material and from 80 to 98 weight percent ammonium nitrate, whereby in response to detonation of said dynamite the said sheath material undergoes detonation to the extent that resulting wave propagation takes place through only a portion thereof and sufficient energy is provided for a seismic record improved over that obtained when black powder is burned as the source of energy for said seismic waves and accompanied by low fish kill.

5. An explosive device of claim 1 wherein the ratio of wall thickness of said sheath to maximum linear cross section of the said dynamite core is within the range of about 0.5:1 to 1.5:1.

6. An explosive device of claim 1 wherein said dynamite contains on a weight basis from 10 to 95 percent ammonium nitrate and from 3 to 11 percent nitroglycerin.

7. An explosive device of claim 1 wherein said detonation rate is within the range of from 1200 to 1800 meters per second.

8. An explosive device of claim 1 wherein said core contains from 3 to 11 percent nitroglycerin, 10 to 60 percent sodium nitrate and 4 to 20 percent carbonaceous material.

9. An explosive device of claim 2 wherein each of the said core members has a diameter of from 1¼ to 3 inches and a length of from 6 to 32 inches.

References Cited in the file of this patent

UNITED STATES PATENTS

| | | |
|---|---|---|
| 1,785,529 | Pratt | Dec. 16, 1930 |
| 2,159,234 | Taylor | May 23, 1939 |
| 2,463,709 | McFarland | Mar. 8, 1949 |
| 2,565,380 | Lawrence | Aug. 21, 1951 |
| 2,599,245 | Finn | June 3, 1952 |
| 2,685,251 | Davis et al. | Aug. 3, 1954 |
| 2,754,755 | Ruth et al. | July 17, 1956 |
| 2,771,961 | Blake | Nov. 27, 1956 |

UNITED STATES PATENT OFFICE
CERTIFICATE OF CORRECTION

Patent No. 3,006,279 October 31, 1961

Robert W. Lawrence

It is hereby certified that error appears in the above numbered patent requiring correction and that the said Letters Patent should read as corrected below.

Column 2, line 47, after "heretofore" insert -- in --; columns 7 and 8, TABLE I, opposite "Average Damage Range, Feet", column 8 of the table, for "38" read -- 58 --; same columns TABLE II, opposite "Cage orientation", column 8 thereof, for "Horzontal" read -- Horizontal --; same columns 7 and 8, TABLE II, footnote 1, line 2 thereof, for "1 1/." read -- 1½ --; column 8, line 32, for "skilled" read -- killed --; line 37, for "pelgaic" read -- pelagic --; column 9, line 3, before "50" insert -- about --; column 10, line 21, for "to" read -- and --.

Signed and sealed this 3rd day of April 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,006,279 — October 31, 1961

Robert W. Lawrence

It is hereby certified that error appears in the above numbered patent requiring correction and that the said Letters Patent should read as corrected below.

Column 2, line 47, after "heretofore" insert -- in --; columns 7 and 8, TABLE I, opposite "Average Damage Range, Feet", column 8 of the table, for "38" read -- 58 --; same columns TABLE II, opposite "Cage orientation", column 8 thereof, for "Horzontal" read -- Horizontal --; same columns 7 and 8, TABLE II, footnote 1, line 2 thereof, for "1 1/." read -- 1½ --; column 8, line 32, for "skilled" read -- killed --; line 37, for "pelgaic" read -- pelagic --; column 9, line 3, before "50" insert -- about --; column 10, line 21, for "to" read -- and --.

Signed and sealed this 3rd day of April 1962.

(SEAL)
Attest:

ERNEST W. SWIDER
Attesting Officer

DAVID L. LADD
Commissioner of Patents